United States Patent Office 3,427,701
Patented Feb. 18, 1969

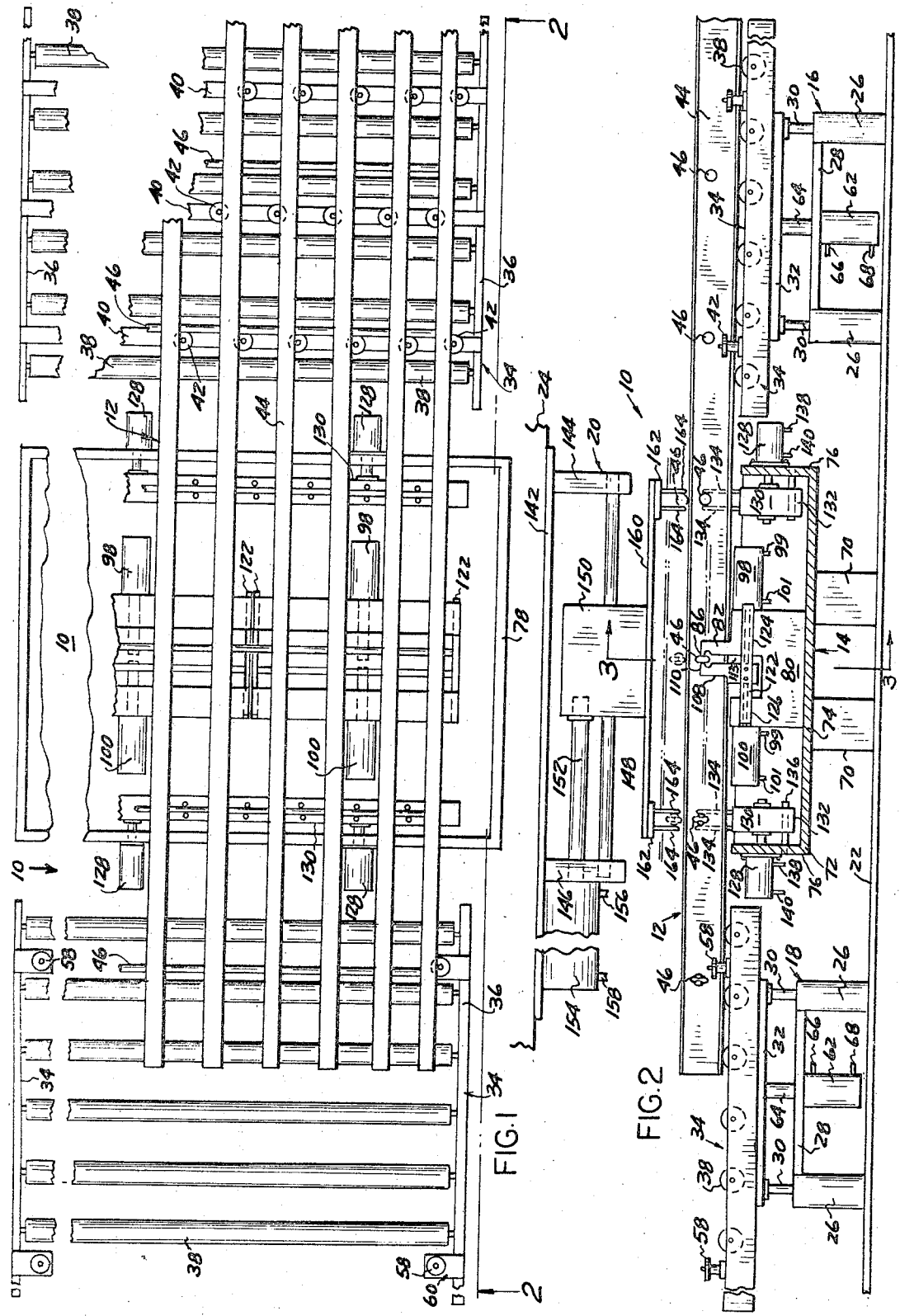

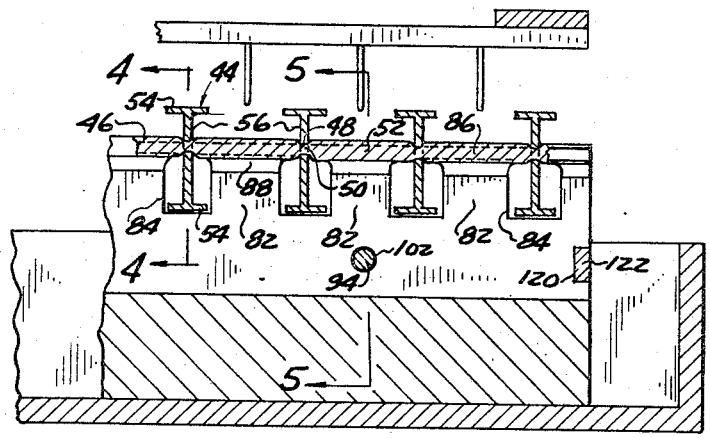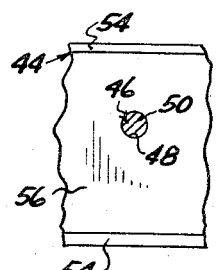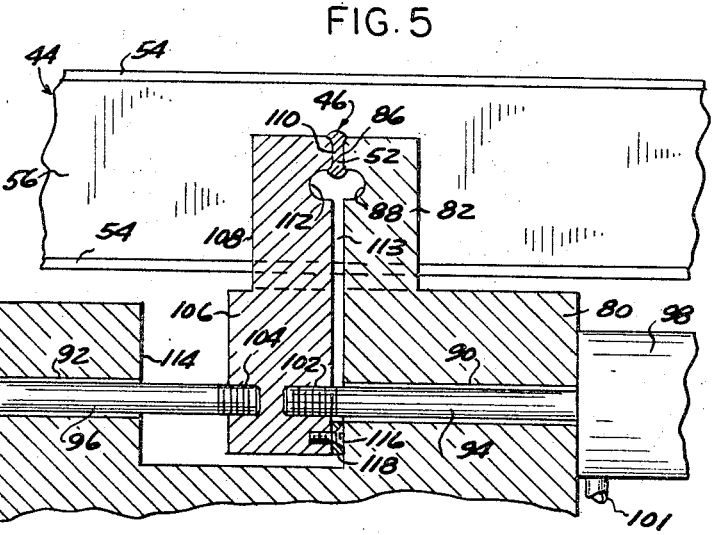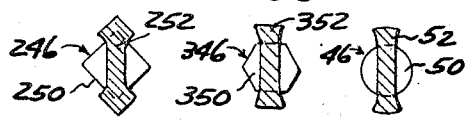

3,427,701
APPARATUS FOR ASSEMBLING GRATINGS
Marion F. McDonnell, 6480 Walnut Lake Road, Rte. 2, Walled Lake, Mich. 48088
Filed May 12, 1966, Ser. No. 549,507
U.S. Cl. 29—200
Int. Cl. B23p 15/12
9 Claims

ABSTRACT OF THE DISCLOSURE

This apparatus for assembling gratings with flanged longitudinal load-bearing bars includes a machine which has dies to forcibly deform and clinch the grating cross bars adjacent opposite ends of the holes through which they traverse the webs of the flanged longitudinal load bearing bars, enlarging each cross bar vertically while thinning it horizontally on opposite sides of each bearing bar it traverses; also which has means for separating the grating from the jaws of the cross bar deforming dies; which has cross bar deforming jaws, one set of which is actuated by the piston of a hydraulic cylinder, preferably actuated by two pistons of two hydraulic coaxial cylinders on opposite sides of the die; which also has torque bars disposed on opposite sides of the dies to absorb the side thrust, maintain alignment of the dies, and take the side thrust off of the piston rod; which has cross bar deforming jaws projecting laterally under the flanges of flanged load-bearing bars, such as I-beams, T-beams, J-beams or L-beams, to deform the cross bars adjacent the opposite ends of the holes in the webs through which the cross bars pass; which provides rising and falling supports for lowering the grating into the spaces between the dies or jaws before deformation and for lifting the grating out of the spaces between the dies or jaws after deformation; and which provides a grating transfer device for shifting the grating bodily from cross bar to cross bar between successive deformations thereof.

In the drawings, FIGURE 1 is a top plan view, partly broken away to conserve space, of an apparatus for assembling gratings, with a grating in position ready for deformation of the cross bars between the flanged longitudinal load-bearing bars, and with the grating-shifting machine of FIGURE 2 omitted to disclose the structure beneath it;

FIGURE 2 is a side elevation of the apparatus of FIGURE 1, partly in section along the line 2—2 in FIGURE 1;

FIGURE 3 is a fragmentary cross-section, upon an enlarged scale, along the line 3—3 in FIGURE 2;

FIGURES 4 and 5 are further enlarged longitudinal sections taken along the lines 4—4 and 5—5 respectively in FIGURE 3;

FIGURE 6 is an enlarged cross-section through a deformed round cross bar after deformation as shown in FIGURE 5;

FIGURE 7 is an enlarged cross-section similar to FIGURE 6, but of a deformed rectangular-section cross bar; and FIGURE 8 is another cross-section similar to FIGURES 6 and 7, but of a deformed hexagonal-section cross bar.

Referring to the drawings in detail, FIGURES 1 and 2 show an apparatus, generally designated 10, for assembling gratings 12, according to one form of the invention, as composed generally of a grating cross bar deforming machine 14 preceded and succeeded by initial and final grating elevating machines 16 and 18 respectively and a grating transfer machine 20 located above the deforming machine 14 for shifting the grating 12 step-by-step while it is elevated by the grating elevating machines 16 and 18 between cross bar deforming operations of the cross bar deforming machine 14. All three machines 14, 16 and 18 rest upon and are supported by the floor 22, such as a concrete floor, whereas the grating transfer machine 20 is suspended over deforming machine 14, as from an overhead bridge-like framework 24, shown in part in FIGURE 2.

The initial and final grating elevating machines 16 and 18 are of similar construction, with the exception of the fact that certain guide rollers in the machine 16 are unnecessary in the machine 18 and are therefore omitted. Each elevating machine 16 or 18 includes four pedestals 26 (two only being shown in FIGURE 2) which are arranged at the four corners of a rectangle and rest upon the floor 22. The pedestals 26 are interconnected at their upper ends by a rectangular framework 28. Each of the pedestals 26 is bored vertically to slidably receive guide rods 30 connected at their upper ends to a rectangular framework 32 which in turn carries a conveyor roller supporting structure or table 34. The latter includes longitudinal side members 36 in which are journalled the opposite ends of conveyor rollers 38, and which are interconnected by cross members 40 rotatably supporting guide rollers 42 at laterally-spaced intervals corresponding to the separations of the flanged longitudinal or load-bearing bars 44 which are interconnected by cross bars 46 passing through holes 48 therein (FIGURE 4). In the form of the invention shown in FIGURES 1 to 6, the cross bars 46 are of circular cross-section at 50 before deformation, and of vertically-elongated cross-section thereafter (FIGURE 6) at deformed portions 52 between the flanged longitudinal load-bearing bars 44, which in the present instance possess flanges 54 along one or more of the edges of their webs 56.

The final grating elevating machine 18, as previously stated, is in most respects similar to the initial elevating machine 16, except that the intermediate guide rollers 42 are omitted as no longer necessary after the machine 14 has performed is operations and only opposite edge guide rollers 58 are provided, these being mounted on inwardly-extending brackets 60 secured to the upper edges of the longitudinal side members 36. The rectangular framework and the conveyor roller supporting structure 34 which it carries in each of the elevating machines 16 and 18 (FIGURE 2) are raised and lowered by cylinders 62, each of which is attached to its respective framework 28. Each of the cylinders 62 contains a reciprocable piston 64, the upper end of which is connected to its particular framework 32. Each cylinder 62 is double-acting in that it has pressure service conduits 66 and 68 at the upper and lower ends so that when pressure is supplied to the lower conduit 68 and exhausted from the upper conduit 66, the piston 64 rises, carrying with it the framework 32 and structure 34. When the pressure connections are reversed, as through a conventional four-way valve (not shown), the piston 64 descends and with it the framework 32 and structure 34 as described below in connection with the operation of the invention.

The cross bar deforming machine 14 includes pedestals 70 (FIGURE 2) resting upon the floor 22 and supporting a rectangular lubricant tank 72 of sufficiently strong construction to serve at the same time as a base. The tank 72 contains a lubricant, such as oil, in which most of the moving parts of the machine 14 are submerged and which serves not only to lubricate these parts but also to absorb and dissipate heat resulting from the cross bar deformation action.

The tank 72 has a bottom wall 74, opposite end walls 76, and opposite side walls 78 interconnecting the end walls and bottom wall 76 and 74 respectively. Mounted on and rising from the central portion of the bottom wall 74 approximately midway between the opposite end walls 76 is a stationary base block 80 of approximately U-shaped cross-section. Mounted on and rising from one end of the base block 80 are laterally-spaced and laterally-aligned stationary deforming dies 82 separated from one another by openings 84 (FIGURE 3) in which the longitudinal bars or load-bearing rails 44 travel. Each stationary die 82 is shown for purposes of simplicity as integral with the base block 80 but in actual practice these are made separate from one another for ease of replacement or repair, such a by reason of wear. Each stationary die 82 terminates in alongitudinally-projecting jaw 86 (FIGURE 5) beneath which is a clearance groove or recess 88.

The base block 80 is provided with forward and rearward aligned bores 90 and 92 respectively for slidably receiving forward and rearward piston rods 94 and 96 arranged in push-pull relationship with one another, the pistons of which (not shown) are reciprocable in forward and rearward hydraulic cylinders 98 and 100 suitably secured, as by bolting, to opposite sides of the base block 80, and having hydraulic fluid service conduits 99 and 101 leading into their opposite ends. The free ends of the piston rods 94 and 96 are threaded into forward and rearward threaded sockets 102 and 104 respectively in the base 106 of a movable deforming die 108 which, like the stationary die 82, in actual practice is made separate from the base 106, for repair or replacement purposes. While the push-pull arrangement employing the tandem small-diameter cylinders 98 and 100 is preferable as giving a strong force in a compact space, it will be evident that a single such cylinder might be substituted, at the expense of compactness for the same force exerted. The movable deforming die 108, like the fixed die 82, has a similar deforming jaw 110 below which is a similar clearance groove 112. The jaws 86 and 110 are separated from one another by gaps 113. From FIGURE 3 it will be seen that the jaws 86 and 110 extend laterally and project under to approach closely to the webs 56 of the longitudinal or load-bearing bars 44 in order to extend the deformation of the cross bars 46 as close as possible to the holes 48.

The die base 106 reciprocates in a cavity 114 of rectangular cross-section in the base block 80. The die base 106 is drilled and threaded on its forward face to receive screws 116 which secure thereto a stop strip 118 which determines the minimum width of each gap 113 and consequently the thickness of the deformed portions 52 of the cross bars 46. The opposite ends of the movable die 108 are grooved as at 120 (FIGURE 3) and drilled and threaded to receive torque bars 122 bolted thereto and slidable in corresponding aligned grooves 124 and 126 in the forward and rearward portions of the base block 80.

After the cross bar 46 has been engaged and deformed by the jaws 86 and 110 of the stationary and movable dies 82 and 108 respectively and the movable dies 108 have been retracted, thereby separating the jaws 110 thereof from the deformed cross bar 46, the latter is disengaged from the jaws 86 of the stationary dies 82 by means of forward and rearward stripping cylinders 128 (FIGURES 1 and 2), so that the grating 12 can be raised from between the dies 82 and 108. The cylinders 128 are bolted or otherwise secured to the opposite end walls 76 of the tank 72. The end walls 76 are bored for the passage of piston rods 130, the free ends of which are threaded into stripper cross-heads 132 from the upper ends of which rise longitudinally-spaced stripper rods 134 spaced apart from one another by a distance slightly greater than the horizontal thickness of the cross bars 46. A dust-tight cover (not shown) connects the perimeter of the base block 80 to the perimeter of the top of the tank 72, and is of an accordion-type construction extending around the stripper cross-heads 132 and so constructed as not to impede the movement of the cross-heads 132.

Each stripper cross-head 132 below its respective piston 130 is bored horizontally to slidably engage a guide rod 135, one end of which is threaded into the end wall 76. The piston rods 130 have pistons (not shown) reciprocable within the cylinders 128. The cylinders 128, like the cylinders 62, are double-action cylinders with opposite end service conduits 138 and 140 respectively connected to a source of pressure fluid (not shown) by way of a conventional four-way valve (not shown). Consequently, when pressure fluid is supplied to the conduits 138 and discharged from the conduits 140, the piston rods 130, crossheads 132 and pairs of stripper rods 134 move in the same direction (to the left in FIGURE 2), engaging and urging the thereby-engaged cross bars 46 to the left. At the same time, hydraulic pressure fluid is admitted to the conduits 99 and discharged from the conduits 101 to detach the movable jaws 110 of the dies 108 from the deformed cross bars 46 as explained under the description of the operation of the invention.

Each grating 12 both before and after deformation of the cross bars 46 is shifted horizontally to the left by the grating transfer machine 20 (FIGURE 2) when each grating 12 has been lifted by the rising of the initial and final elevating machines 16 and 18 after detachment of the jaws 86 and 110 from the cross bar 46 being deformed. For this purpose, the grating transfer machine 20 consists of a base plate 142 bolted or otherwise secured to the overhead framework 24 and having longitudinally-spaced brackets 144 and 146 respectively bolted or otherwise secured thereto. The brackets are bored in alignment to receive the opposite ends of parallel guide rods 148 (one only being shown in FIGURE 2). Slidable along the horizontal guide rods 148 and bored horizontally to receive them is a carriage 150. The latter is drilled and threaded to receive one end of a correspondingly threaded piston rod 152, the opposite end of which carries a piston (not shown) reciprocable within a cylinder 154 to the opposite ends of which are connected pressure fluid service conduits 156 and 158. Bolted or otherwise secured to the bottom of the carriage 150 is a frame 160, to the opposite ends of which are secured cross members 162 from which depend longitudinally-spaced shift pins 164 spaced apart from one another by a distance slightly greater than the thicknesses of the cross bars 46. As a consequence, when the grating 12 is lifted by the initial and final lifting machines 16 and 18 so that its cross bars 46 move upward from between the die jaws 86 and 110 into the spaces between the depending pairs of pins 164, pressure fluid is supplied to the conduit 156 and discharged from the conduit 158 to move the carriage 150 and with it the grating 12 to the left while the latter rolls along the conveyor rollers 38.

In order to operate the cylinder 62, 98, 100, 128 and 154 in proper sequence and in timed relationship with one another, they are interconnected by a fluid circuit (not shown) containing conventional four-way valves, preferably solenoid-operated by an electrical control circuit (not shown) and supplied from a pressure fluid source (not shown).

In the operation of the invention, let it be assumed that an undeformed grating 12 has been pre-assembled with its cross bars 46 passing through the holes 48 in the webs 56 of the longitudinal load-bearing bars 44. Let it also be assumed that the deformation dies 82 and 108 have been separated to their widest extent and that pressure fluid has been supplied to the lower service conduits 68 of the cylinders 62 to raise the tables 34 to their maximum heights. The undeformed grating 12 is then placed upon the rollers 38 of the tables 34 with the forward ends of its load-bearing longitudinal bars 44 aligned with the openings 84 (FIGURE 3), and slid along the latter through the openings 84 until the first cross bar 46 lies immediately over the gaps 113 between the jaws 86 and 110 of the deformation dies 82 and 108. This is conveniently and accurately accomplished by aligning the foremost cross bar 46 with the rearmost pairs of shift pins 164 of the grating transfer machine 20 so as to rise between them when the tables 34 are raised, and by then operating the cylinder 154 to cause its piston 152 to shift the foremost cross bar 46 forward to its proper position over the die gaps 113 and aligned with the pairs of stripper pins 134.

Pressure fluid is then supplied to the upper conduits 66 of the table cylinders 62 and exhausted through the lower conduits 68 to cause the tables 34 to descend, carrying with them the grating 12 and causing the foremost cross bar 46 to come to rest between the jaws 86 and 110 of the deformation dies 82 and 108. Pressure fluid is now supplied to the conduits 101 of the cylinders 98 and 100 and exhausted from the conduits 99 thereof (FIGURE 2), causing the movable dies 108 to move toward the stationary dies 82 and cause the movable die jaws 110 to engage and push the cross bar 46 against the fixed jaws 86 as anvils and consequently deform the intervening portions 52 of the cross bars 46 from the circular cross-section of the portions 50 lying within the holes 48 to the vertically-elongated cross-section of the intervening portions 52 (FIGURES 3, 5 and 6). This deformation on opposite sides of each hole 48 effectively clinches each cross bar 46 at each of its junctions with the longitudinal load-bearing bars 44 and positively prevents any relative motion therebetween. The axial thickness of each deformed portion 52 is determined by the thickness of the stop strip 118 (FIGURE 5) which halts the jaw 110 by halting its base portion 106 against the stationary base block 80 (FIGURE 5).

Pressure fluid is now supplied to the conduits 99 and exhausted from the conduits 101 of the cylinders 98 and 100 to cause the piston rods 94 and 96 to move the movable dies 108 away from the stationary dies 82, detaching the die jaws 110 from the now deformed cross bar 46. Pressure fluid is now supplied to the conduits 138 of the cylinders 128 (FIGURE 2) and exhausted from the conduits 140 thereof, causing the piston rods 130, cross-heads 132 and stripper pins 134 to move forward to the left, carrying with them the cross bar 46 immediately behind the cross bar 46 which has just been deformed and clinched, and detaching its deformed portions 52 from the jaws 86 of the stationary dies 82. Meanwhile, during the deformation step of the operation, the torque bars 122, sliding in the grooves 124 and 126 in the base block 80, effectively prevent misalignment of the movable dies 108 and sustain the side thrusts of the piston rods 94 and 96.

Pressure fluid is now supplied to the lower conduits 68 of the cylinders 62 and exhausted from the upper conduits 66 thereof, thereby causing the pistons 64 to raise the tables 34 and consequently to lift the just-deformed cross bar 46 out of the gap 113 and the undeformed cross bar 46 immediately behind it into the spaces between the depending pins 164 of the grating transfer machine 20. At the same time, the lower flanges 54 of the longitudinal load-bearing bars 44 move upward in their respective openings 84 in adjacent dies 82 and 108 from the positions shown in FIGURE 3.

Pressure fluid is now admitted to the conduit 156 and discharged from the conduit 158 of the cylinder 154, thereby causing the piston 152 thereof to shift the carriage 150 and frame 160 one step forward, equivalent to one interval between adjacent cross bars 46, thereby pushing the grating 12 that distance forward (to the left in FIGURE 2) and causing the next undeformed cross bar 46 to come to rest above the gap 113 between the now-retracted die jaws 86 and 110. Pressure fluid is now admitted to the upper conduit 66 of the cylinder 62 and exhausted from the lower conduit 68 thereof, causing the pistons 64 and the tables 34 of the initial and final grating elevating machines 16 and 18 to descend, carrying with them the grating 12 and positioning the undeformed cross bar 46 between the jaws 86 and 110, ready for the next deformation operation. This is carried out in the manner described above and repeated for each cross bar 46 of the grating 12. It will be evident from FIGURE 2 that when the second cross bar has been deformed and the grating 12 is subsequently elevated for transfer, the foremost and first-deformed cross bar 46 and the third or foremost undeformed cross bar 46 move between the forward and rearward pairs of pins 164 of the frame 160 of the grating transfer carriage 150 and thus engage two cross bars 46 simultaneously while transferring the grating 12 to the next cross bar deformation position. In this manner, the previously-round cross bars 46 are deformed one by one between their respective load-bearing rails 44 until all have been deformed and thereby clinched on opposite sides of their longitudinal bars 44.

The operation of the grating assembling apparatus 10 is not confined to the deformation of cross bars 46 of circular cross-section as described above and shown in FIGURES 1 to 6 inclusive. FIGURE 7 shows a cross-section through a cross bar 246 of normally rectangular cross-section 250 between correspondingly rectangular holes in the longitudinal load-bearing bars 44 but deformed into elongated double-spearheaded-shaped cross-section 252 between longitudinal bars 44 on opposite sides of their respective holes. Similarly, FIGURE 8 shows a cross-section through a cross bar 346 of normally hexagonal cross-section 350 between correspondingly hexagonal holes in the longitudinal load-bearing bars 44 but deformed into elongated capstan-shaped cross-section 352 between longitudinal bars 44 on opposite sides of their respective holes.

What I claim is:

1. An apparatus for assembling gratings with flanged longitudinal load-bearing bars by clinching the cross bars thereof adjacent and on opposite sides of the holes in the webs of the longitudinal bars through which the cross bars pass, said apparatus comprising a grating cross bar deforming machine having a plurality of laterally-spaced pairs of cross bar deforming dies with the dies of each pair movable relatively to one another into and out of deforming engagement with a grating cross bar momentarily inserted therebetween and including means for so relatively moving said dies of said pairs of dies, said pairs of said dies having cross bar deforming jaws projecting laterally under the flanges of the flanged longitudinal load-bearing bars into close proximity to the webs thereof and also projecting longitudinally toward the portions of the cross bars adjacent the holes in the webs through which the cross bars pass.

2. A grating-assembling apparatus, according to claim 1, wherein there is also provided means for disengaging the deformed cross bar from one of the dies of each pair upon disengagement of the other die of each pair therefrom.

3. A grating-assembling apparatus, according to claim 1, wherein one die of each pair has a stop element connected thereto and limiting the approach of the dies of each pair to a definite separation thereof.

4. A grating-assembling apparatus according to claim 1, wherein said die-moving means includes a plurality of hydraulic cylinders with pistons disposed on opposite sides of the die so moved in push-pull relationship with one another.

5. A grating-assembling apparatus, according to claim 1, wherein one die of each pair is provided with torque members connected thereto and disposed in sliding engagement with the other die of said pair.

6. An apparatus for assembling gratings by clinching the cross bars thereof on opposite sides of the holes in the longitudinal bars through which the cross bars pass, said apparatus comprising a grating cross bar deforming machine having a plurality of laterally-spaced pairs of cross bar deforming dies with the dies of each pair movable relatively to one another into and out of deforming engagement with a grating cross bar momentarily inserted therebetween and including means for so relatively moving said dies of said pairs of dies, and initial and final grating elevating conveyor machines disposed in longitudinally-spaced relationship at opposite ends of said deforming machine and having vertically-movable grating supports thereon and including means for moving the same vertically.

7. A grating-assembling apparatus, according to claim 6, which also includes a grating transfer machine with a longitudinally-movable grating transfer device and which further includes means adapted to engage and move longitudinally a grating on said supports upon elevation of said grating supports.

8. A grating-assembling apparatus, according to claim 7, wherein said grating transfer machine is disposed above said grating cross bar deforming machine, and wherein said grating engaging and moving means includes grating grippers depending from said transfer machine into engageability with a grating raised by said elevating machines.

9. A grating-assembling apparatus, according to claim 8, wherein said grating engaging and moving means includes a horizontally-disposed guideway connected to said transfer machine, also includes a carriage movable horizontally along said guideway, and further includes a pressure fluid cylinder having a reciprocable piston operatively connected to said carriage for moving the same horizontally along said guideway.

References Cited

UNITED STATES PATENTS

| | | | |
|---|---|---|---|
| 1,838,732 | 12/1931 | Bates | 29—200 |
| 1,867,701 | 7/1932 | Keown | 29—160 |
| 3,110,340 | 11/1963 | Valverde | 72—407 X |

THOMAS H. EAGER, *Primary Examiner.*